United States Patent
Chen

Patent Number: 5,897,827
Date of Patent: Apr. 27, 1999

[54] METHOD FOR MANUFACTURING FOOD CONTAINERS

[76] Inventor: Chun-Huei Chen, No. 394, Chung Cheng Road, San Wan Village, San Wan Hsiang, Miaoli Hsien, Taiwan

[21] Appl. No.: 08/918,541

[22] Filed: Aug. 22, 1997

[51] Int. Cl.[6] ...................................... B29C 51/02

[52] U.S. Cl. .......................... 264/460; 264/553; 264/112; 264/115

[58] Field of Search ................................... 264/115, 460, 264/553, 554, 112

[56] References Cited

U.S. PATENT DOCUMENTS

| 5,411,691 | 5/1995 | Hwang | 264/115 |
| 5,500,089 | 3/1996 | Huang et al. | 162/226 |

*Primary Examiner*—Mary Lynn Theisen

[57] ABSTRACT

A method for manufacturing food container includes the following steps: the husks of rice, oat, corn, soya bean, wheat or the mixture thereof are used as raw material to make food containers; an eatable adhesive is added in order to bind the husks; the bound husks is rolled into a sheet; after sterilizing the sheet with UV light; the sheet is shaped into a container of a desired shape, such as a bowl or a tray; a water-resistant is coated on the surface of the container.

16 Claims, 5 Drawing Sheets

METHOD FOR MANUFACTURING FOOD CONTAINERS

This invention relates to a method for manufacturing food containers and in particular to a method for manufacturing biodegradable, recycleable, and low cost food containers from husks of rice, oat, corn, soya bean, wheat or the mixture thereof.

BACKGROUND OF THE INVENTION

Recently, disposable food containers are widely used in daily life and they are discarded after use. Some of the disposable containers used as bowls or cups are usually made of plastic material, such as expandable polystyrene, polypropylene or polyester foam. However, the disposable containers made of plastic material have a multitude of disadvantages. A major drawback of the disposable containers made of the plastic material is that it is not biodegradable and will exist for hundreds of years. Further, the disposable containers made of plastic material produce toxic gas when heated or burned, which causes air-pollution.

As a result, efforts have been made to develop biodegradable containers. Some prior art suggests using paper or starch to manufacture food containers. The use of paper as the raw material for food container is not a good choice, for paper is generally made from wood, pulp and woods are decreasing dramatically recently. Starch extracted form rice, wheat, potatoes or corns is a suitable material for the manufacturing of food containers. However, starch may serve as food for human being and other animals and is expensive. The manufacturing cost for the starch container is high and therefore cannot be widely used.

For solving the above problems, a method for manufacturing food containers is disclosed in Japanese Patent Application No. 6-259384. The method of Japanese Patent Application No. 6-259384 comprises the steps of (1) the husks are ground into powder or granular shape; (2) the husks are mixed with a cashew paint; (3) the mixture of the husks and the cashew paint is put. on a mold and then molded by means of adding on pressure through high temperature; and (4) a water-resistant paint is coated on the surface of the modeled container. However, the ratio of the husks and the cashew paint in the method of Japanese Patent No. 8-91340 is not defined clearly so that variations in the content of the husks and cashew paint may cause a variation of the quality of containers and the rate of degraded product may be increased which leads to an increase of the manufacturing cost Further, a method for making disposable bowls and trays is disclosed in U.S. Pat. No. 5,500,089. The method of U.S. Pat. No. 5,500,089 comprises a multitude of steps and two of the steps are that the dried fiber sections are added to a container of starch paste containing water and then the dried fiber sections and starch paste are mixed to form mixed fiber and starch. However, the ratio of the dried fiber sections, starch paste and water is also not defined clearly in the two steps so that variations in the content of dried fiber sections, starch paste and water may also cause a variation of the quality of containers and the rate of degraded product may be increased which leads to an increase of the manufacturing cost.

Thus, it is desirable to have a method for manufacturing food containers to overcome above problems.

SUMMARY OF THE INVENTION

The principal object of the present invention is to provide a method for manufacturing food containers which uses waste materials, such as husks, as raw materials. Therefore, the manufacturing cost is low and the container made thereof is biodegradable.

In accordance with the present invention, there is provided a method for manufacturing food containers comprising: (a) grinding the mixture of husks into powder; (b) mixing the powder with eatable adhesives and water to form an intermediate material; (c) rolling the product of step (b) into a sheet; (d) sterilizing the sheet with UV light; (e) vacuum shaping the sheet into a food container; (f) coating the container with water-resistant agents; and (g) drying the container.

BRIEF DESCRIPTION OF THE DRAWINGS

The present invention will be better understood from the following description of preferred embodiments thereof, with reference to the attached drawings, wherein.

DETAILED DESCRIPTION OF THE PREFERRED EMBODIMENT

Figure 1:
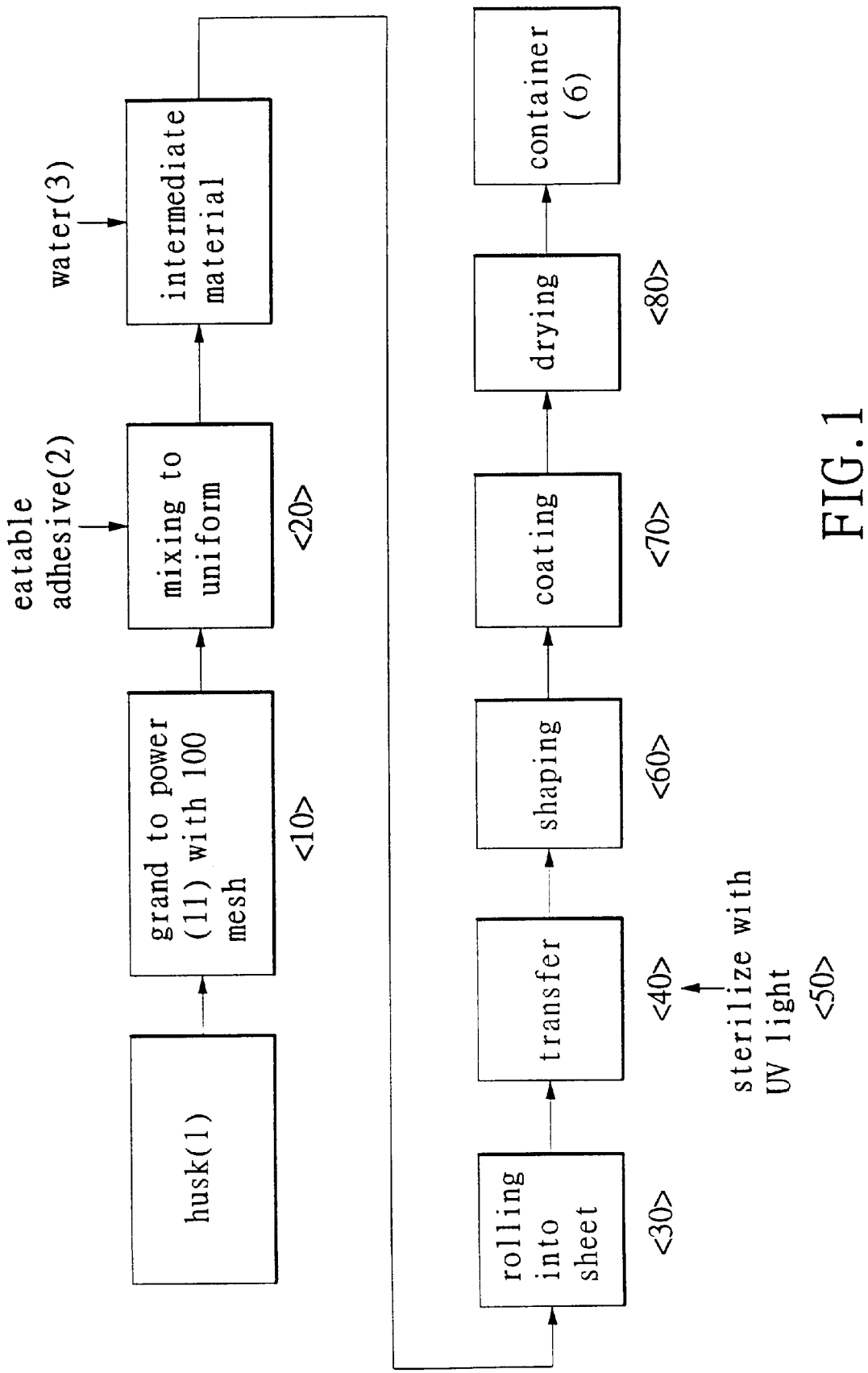
FIG. 1 is a block diagram illustrating the manufacturing process of an embodiment of a method for manufacturing food containers in accordance with the present invention.
Figure 4:
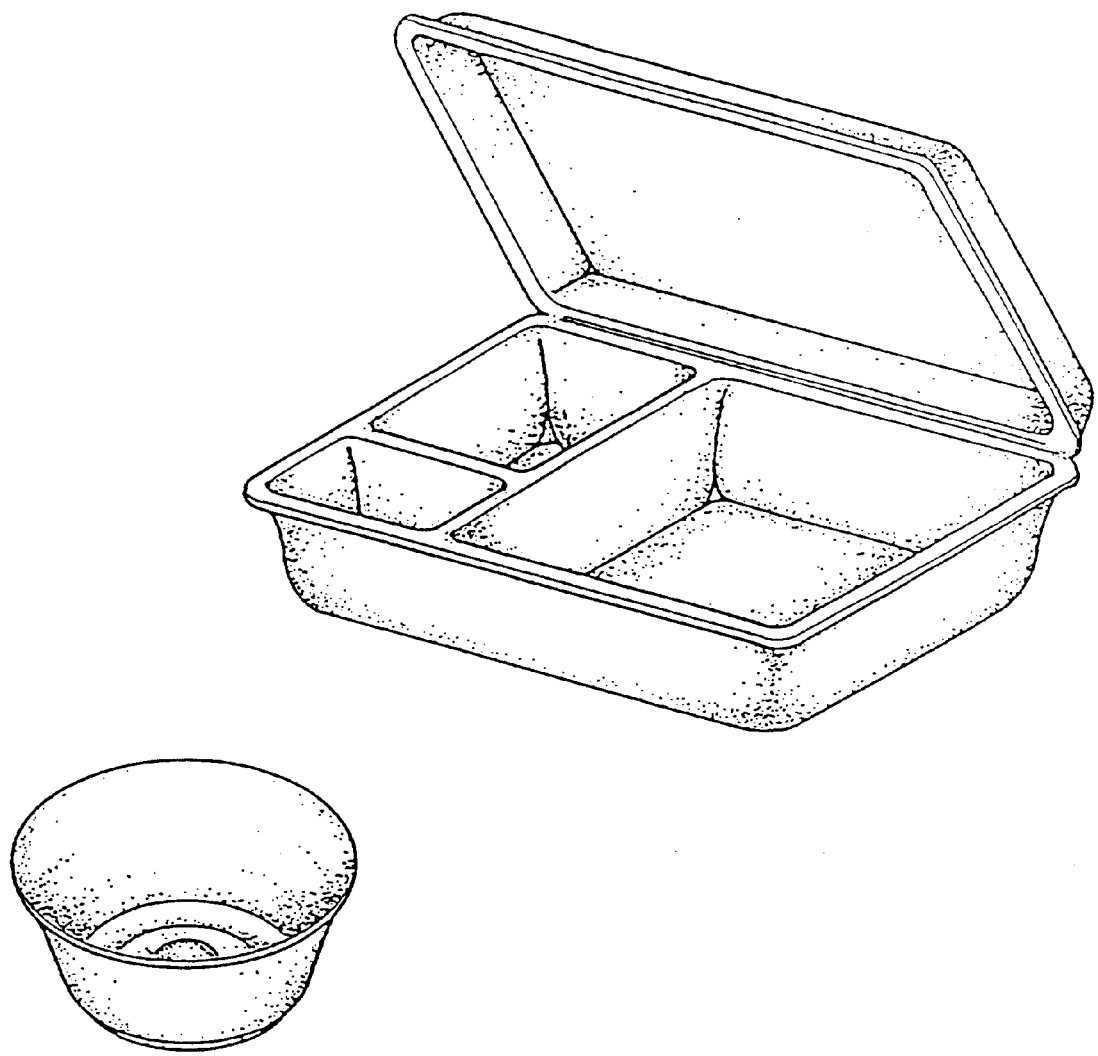
FIG. 4 is a perspective view of the containers made from the embodiment of FIG. 1, 2 or 3 in accordance with the present invention.

Referring to FIG. 1, wherein a block diagram illustrating the manufacturing process of a method for manufacturing food containers in accordance with the present invention is shown, the method for manufacturing food containers comprises: the husks (1) of rice, oat, corn, soya bean, wheat, individually or in combination, are ground to powder (11) form having a size of 100 meshes. An eatable adhesive (2), preferably polyvinyl alcohol is added to the powder (11) and then the mixture of the powder (11) and the eatable adhesive (2) is stirred to form a uniform mixture. Water (3) is added to the uniform mixture and then the mixture of the uniform mixture and the water (3) is speedily stirred for about 30 seconds to obtain an intermediate material (4). Preferably, the ratio of the powder (11), eatable adhesive (2) and water(3) is 55:15:30 with a variation of 5 percent. Then, the intermediate material (4) is delivered to a rolling machine and then rolled into a sheet (5). The rolled sheet (5) is transferred by means of a transferring machine and sterilized simultaneously by UV light. The sterilized sheet is put in a vacuum shaping machine and then shaped into a container of a desired shape, such as a bowl or a tray. A water-resistant agent is coated on the surface of the container. After drying, a biodegradable, recycleable and low cost container shown in FIG. 4 is obtained.

Figure 2:
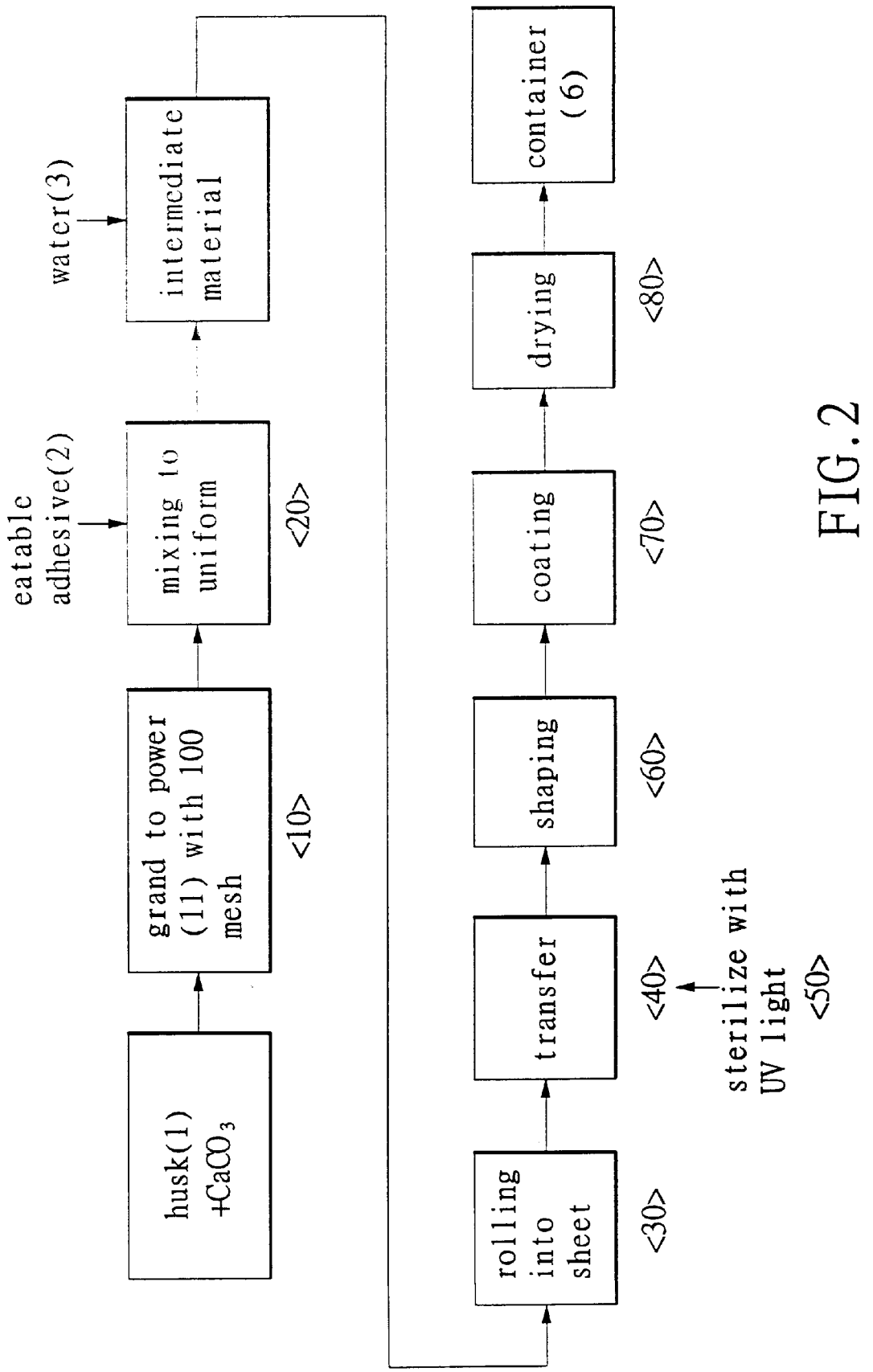
FIG. 2 is a block diagram illustrating the manufacturing process of another embodiment of a method for manufacturing food containers in accordance with the present invention.

The hardness of the container may be increased by means of adding $CaCO_3$ as illustrated in FIG. 2. The method for manufacturing food containers of the embodiment of FIG. 2 in accordance with the present invention comprises: $CaCO_3$ is added to and mixed with the husks (1) of rice, oat, corn, soya bean, wheat or the mixture thereof, the ratio of the $CaCO_3$ and the husks (1) being preferably 40:60. The mixture of the $CaCO_3$ and the husks (1) is ground to powder (11) form having a size of 100 meshes. An eatable adhesive (2), preferably polyvinyl alcohol is added to the powder (11) and then the mixture of the powder (11) and the eatable adhesive (2) is stirred to form a uniform mixture. Water (3) is added to the uniform mixture and then the mixture of the uniform mixture and the water (3) is speedily stirred for about 30 seconds to obtain an intermediate material (4). Preferably, the ratio of the powder (11), eatable adhesive (2) and water (3) is 55:15:30 with a variation of 5 present. Then, the intermediate material (4) is delivered to a rolling machine and then rolled into a sheet (5). The rolled sheet (5) is transferred by means of a transferring machine and sterilized simultaneously by UV light. The sterilized sheet is put in a vacuum shaping machine and then shaped into a container of a desired shape, such as a bowl or a tray. A water-resistant agent is coated on the surface of the container. After drying, a biodegradable, recycleable and low cost container shown in FIG. 4 is obtained.

Figure 3:
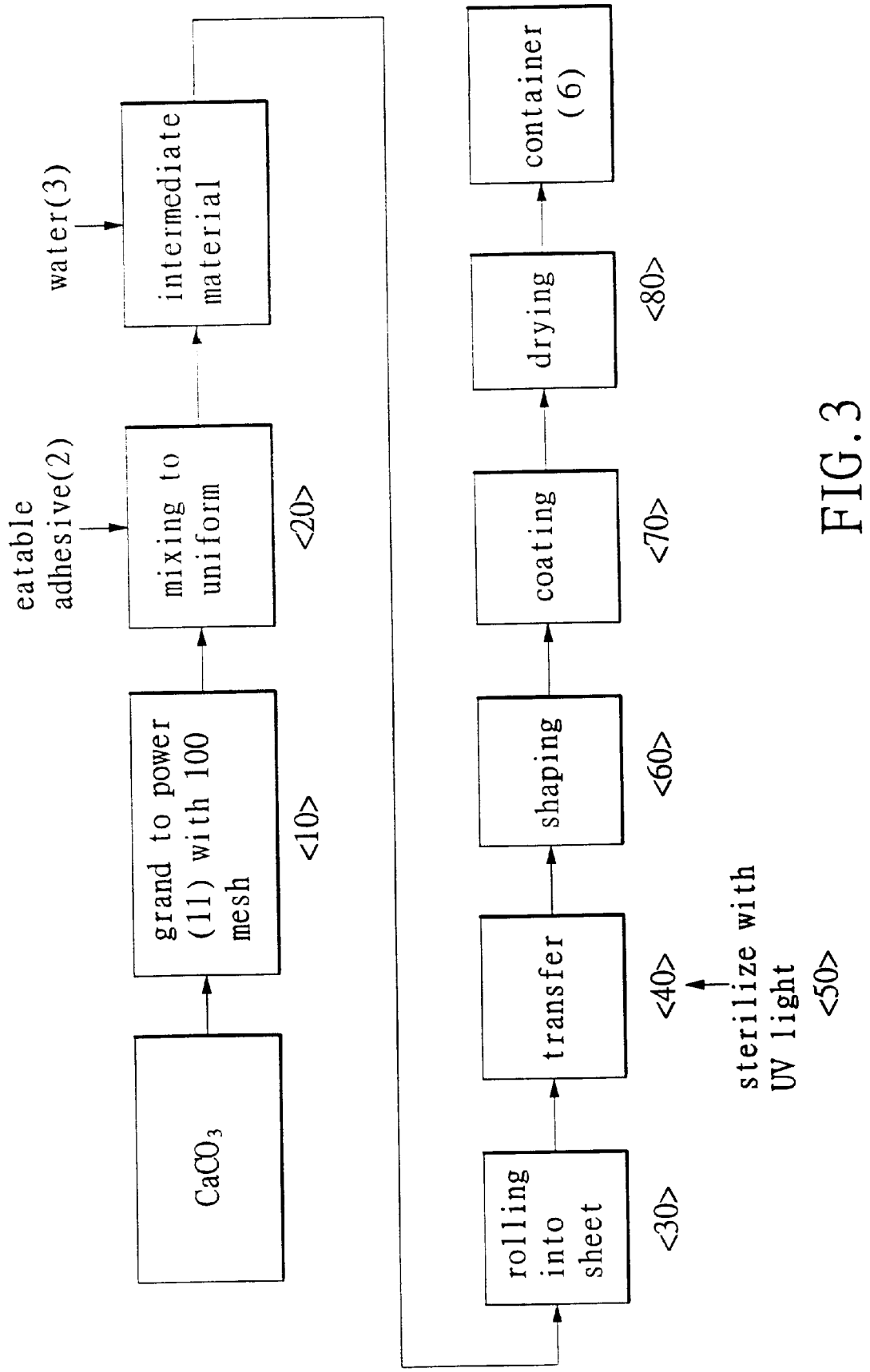
FIG. 3 is a block diagram illustrating the manufacturing process of yet another embodiment of a method for manufacturing food containers in accordance with the present invention.

In the manufacturing method of the embodiment of FIG. 2, the husks (1) may be completely replaced by $CaCO_3$ as illustrated in FIG. 3. Therefore, the method for manufacturing food containers of the embodiment of FIG. 3 in accordance with the present invention comprises: $CaCO_3$ is ground to powder (11) form having a size of 100 meshes. An eatable adhesive (2), preferably polyvinyl alcohol is added to the powder (11) and then the mixture of the powder (11) and the eatable adhesive (2) is stirred to form a uniform mixture. Water (3) is added to the uniform mixture and then the mixture of the uniformed mixture and the water (3) is speedily stirred for about 30 seconds to obtain an intermediate material (4). Preferably, the ratio of the powder (11), eatable adhesive (2) and water (3) is 55:15:30 with a variation of 5 percent. Then, the intermediate material (4) is delivered to a rolling machine and then rolled into a sheet (5). The rolled sheet (5) is transferred by means of a transferring machine and sterilized simultaneously by UV light. The sterilized sheet is put in a vacuum shaping machine and then shaped into a container of a desired shape, such as a bowl or a tray. A water-resistant agent is coated on the surface of the container. After drying, a biodegradable, recycleable and low cost container shown in FIG. 4 is obtained.

Figure 5:
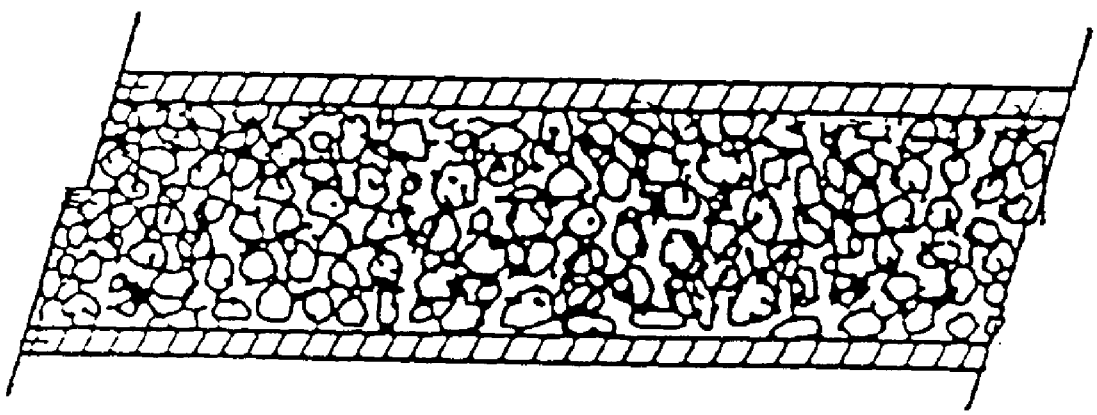
FIG. 5 is a partial cross-sectional view illustrating the cross section of the container of FIG. 4.

The shock strength of the food container produced by means of the method of FIG. 1, 2 or 3 is about 0.7 to 0.8 $kg/cm^2$. FIG. 5 illustrates a partial cross-sectional view of the biodegradable container manufactured by the present invention as shown in FIG. 4.

Although preferred embodiments have been described to illustrate the present invention, it is apparent that changes and modifications in the specifically described embodiments can be carried out without departing from the scope of the invention intended to be limited only by the appended claims.

What is claimed is:

1. A method for manufacturing food containers from husks of rice, oat, corn, soya bean, wheat or the mixture thereof, wherein the method comprising the steps of:
   (a) grinding said husks into powder;
   (b) adding an eatable adhesive into said powder of step (a) and then stirring the mixture of the eatable adhesive and said powder of step (a) to form a uniform mixture;
   (c) adding water into said uniform mixture of step (b) and then stirring the mixture of the water and said uniform mixture of step (b) to form an intermediate material;
   (d) rolling said intermediate material of step (c) into a sheet;
   (e) sterilizing said rolled sheet of step (d) with UV light;
   (f) vacuum shaping said sterilized sheet of step (e) into a container of a desired shape;
   (g) coating the surface of the container obtained from step (f) with a water-resistant agent; and
   (h) drying said container of step (g).

2. The method as claimed in claim 1, wherein the size of said powder of step (a) is 100 mesh.

3. The method as claimed in claim 1, wherein the percentage ratio of said powder, eatable adhesive and water within said intermediate material of step (c) is 55:15:30 with a variation of 5 percent.

4. The method as claimed in claim 1, wherein said eatable adhesive is polyvinyl alcohol.

5. The method as claimed in claim 1, wherein in step (c) the mixture of said uniform mixture and water is stirred for 30 seconds.

6. A method for manufacturing food containers from the mixture of $CaCO_3$ and husks of rice, oat, corn, soya bean, wheat or the mixture thereof, wherein the method comprising the steps of:
   (a) grinding said mixture of $CaCO_3$ and husks into powder;
   (b) adding an eatable adhesive into said powder of step (a) and then stirring the mixture of the eatable adhesive and said powder of step (a) to form a uniform mixture;
   (c) adding water into said uniform mixture of step (b) and then stirring the mixture of the water and said uniform mixture of step (b) to form an intermediate material;
   (d) rolling said intermediate material of step (c) into a sheet;
   (e) sterilizing said rolled sheet of step (d) with UV light;
   (f) vacuum shaping said sterilized sheet of step (e) into a container of a desired shape;
   (g) coating the surface of the container obtained from step (f) with a water-resistant agent; and
   (h) drying said container of step (g).

7. The method as claimed in claim 6, wherein the ratio of $CaCO_3$ and husks is 40:60.

8. The method as claimed in claim 6, wherein the size of said powder of step (a) is 100 mesh.

9. The method as claimed in claim 6, wherein the percentage ratio of said powder, eatable adhesive and water within said intermediate material of step (c) is 55:15:30 with a variation of 5 percent.

10. The method as claimed in claim 6, wherein said eatable adhesive is polyvinyl alcohol.

11. The method as claimed in claim 6, wherein in step (c), the mixture of said uniform mixture and water is stirred for 30 seconds.

12. A method for manufacturing food containers from $CaCO_3$, wherein the method comprising the steps of:
   (a) grinding said $CaCO_3$ into powder;
   (b) adding an eatable adhesive into said powder of step (a) and then stirring the mixture of the eatable adhesive and said powder of step (a) to form a uniform mixture;
   (c) adding water into said uniform mixture of step (b) and then stirred the mixture of step (b) to form an intermediate material;
   (d) rolling said intermediate material of step (c) into a sheet;
   (e) sterilizing said rolled sheet of step (d) with UV light;

(f) vacuum shaping said sterilized sheet of step (e) into a container of a desired shape;

(g) coating the surface of the container obtained from step (f) with a water-resistant agent; and (h) drying said container of step (g).

13. The method as claimed in claim 12, wherein the size of said powder of step (a) is 100 mesh.

14. The method as claimed in claim 12, wherein the percentage ratio of said powder, eatable adhesive and water within said intermediate material of step (c) is 55:15:30 with a variation of 5 percent.

15. The method as claimed in claim 12, wherein said eatable adhesive is polyvinyl alcohol.

16. The method as claimed in claim 12, wherein in step (c), the mixture of said uniform mixture and water is stirred for 30 seconds.

* * * * *